Sept. 27, 1949. J. H. THOMAS 2,482,883
WIRE TOOTH
Filed Oct. 29, 1947
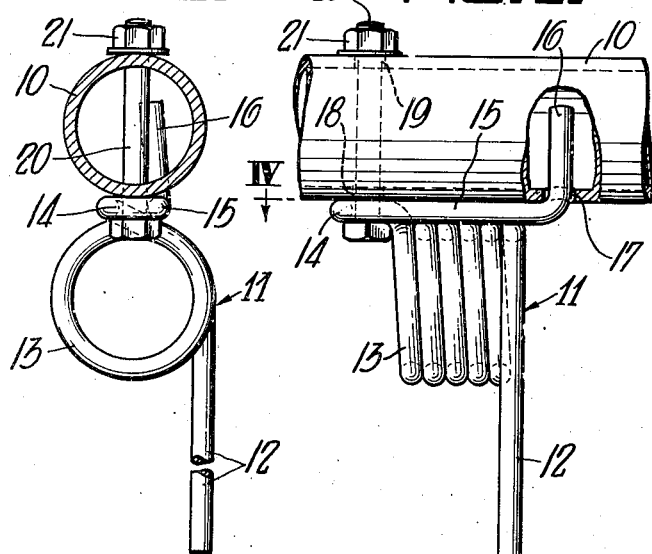
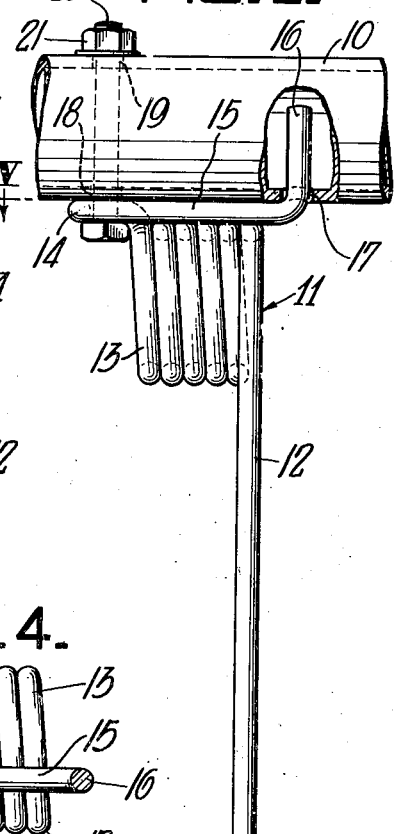
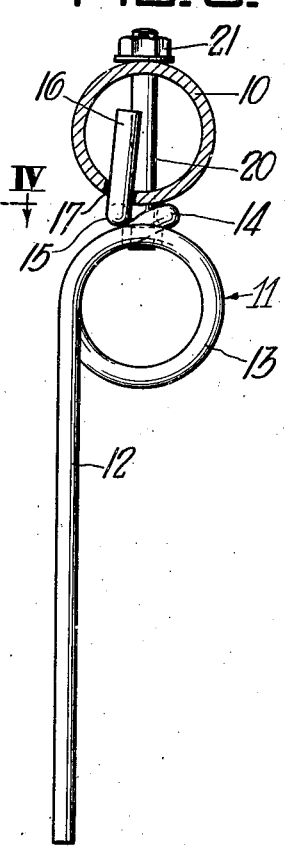
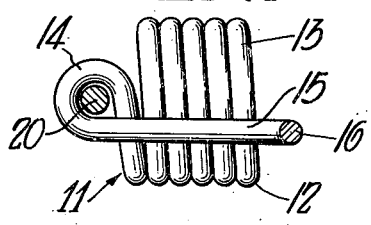
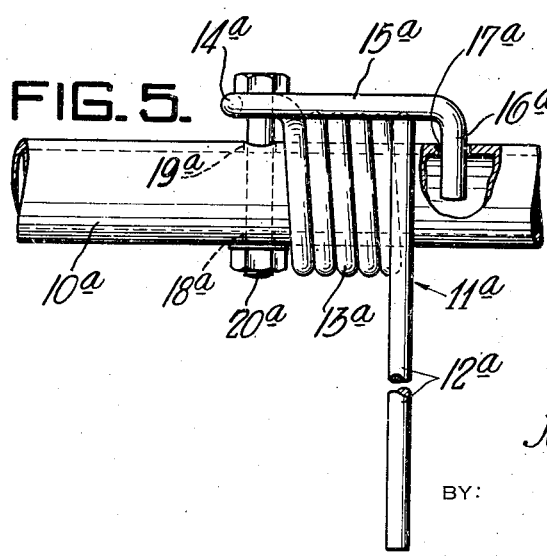
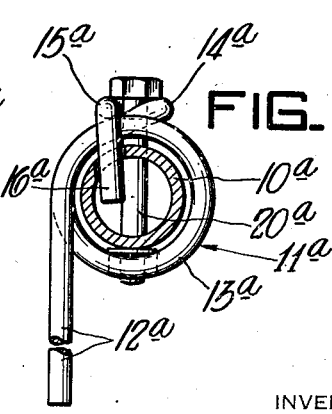
INVENTOR:
JOHN H. THOMAS,
BY: Donald G. Dalton
HIS ATTORNEY.

Patented Sept. 27, 1949

2,482,883

UNITED STATES PATENT OFFICE 2,482,883

WIRE TOOTH

John H. Thomas, North Chicago, Ill., assignor to The American Steel and Wire Company of New Jersey, a corporation of New Jersey Application October 29, 1947, Serial No. 782,912

8 Claims. (Cl. 56—400)

This invention relates to wire teeth and particularly those of the type embodied in farm implements, such as rakes, hay loaders, or harrows.

Such implements commonly comprise a horizontal bar or the like which carries the teeth. The latter have free ends for engaging the ground beneath the implement and commonly include coiled portions adjacent their supported region. These coiled portions permit teeth to flex on striking a fixed obstruction, such as a large stone, and thus tend to prevent tooth breakage.

It is known that flexing of a wire tooth may cause the tooth to vibrate and that such vibrating ultimately may cause tooth breakage through fatigue. The advantages of forestalling fatigue failure in teeth by dampening such vibrations have been recognized heretofore and various schemes have been devised for this purpose. However, none of these with which I am familiar have proved practical, mostly for the reasons that they are unduly costly or cumbersome or soon lose their effectiveness.

Furthermore, means heretofore employed for attaching wire teeth to their support have in many instances been unduly costly and complex, including, for example, sheet metal clips bolted to the support and surrounding a portion of the tooth. It has been customary also to form teeth in integral pairs and to mount the teeth with the supporting bar received within the coiled portions. When teeth are formed in pairs, it is necessary to replace two teeth for each one broken. The practice of mounting teeth with the supporting bar passing through the coils may necessitate removal of several teeth from the support to reach a single broken tooth.

The principal object of the present invention is to provide wire teeth having vibration dampening means and being of improved design whereby the foregoing disadvantages are eliminated.

A further object of the invention is to provide improved wire teeth having simplified vibration dampening means and being attachable to a support by use of only a single bolt and nut.

A further object of the invention is to provide improved wire teeth having coils to permit flexing and means for dampening vibrations, wherein alternate designs make possible supporting of the tooth with the support bar either alongside the coil or received within the coil.

In accomplishing these and other objects of the invention I have provided improved details of structure, preferred forms of which are shown in the accompanying drawings wherein:

Figure 1 is a side elevational view of an improved wire tooth embodying features of the present invention mounted on a supporting bar;

Figure 2 is an end elevational view of the tooth from the left as viewed in Figure 1;

Figure 3 is an end elevational view of the tooth from the right as viewed in Figure 1;

Figure 4 is a sectional view taken substantially on line IV—IV of Figure 1;

Figure 5 is a side elevational view similar to Figure 1, but showig a modified construction; and Figure 6 is an end elevational view of the modified tooth from the right as viewed in Figure 5.

Referring more in detail to the drawings:

In Figures 1 to 4, inclusive, there is shown a tooth mounting bar 10 of a farm implement, such as a rake, hayloader or harrow. The bar is illustrated as being of tubular form, although obviously the invention is not limited to any particular configuration of bar. A wire tooth 11 embodying the improved construction of the present invention is secured to said mounting bar.

Tooth 11 includes an elongated, downwardly depending portion 12 having a free end adapted to engage the ground beneath the implement. Integral with the upper extremity of said depending portion is a coil 13 which extends with its axis perpendicular thereto and permits the tooth to flex as the free end strikes any relatively fixed obstruction. As best shown in Figure 4, the wire at the opposite end of coil 13 has a reverse bend which forms an eye 14. From said eye an integral segment 15 of the wire extends back horizontally across the length of the coil. Segment 15 is substantially parallel to the coil axis, although it may converge slightly theretoward, and lies in close proximity to the wires in said coil, preferably being in contact with at least one of the coil convolutions. At the extremity of segment 15 the wire is bent perpendicularly to form an integral upstanding segment 16, which extends away from the coil axis.

For mounting a tooth constructed in accordance with the embodiment of the invention just described, bar 10 has a transverse aperture 17 to receive upstanding segment 16 of the tooth and a pair of aligned transverse apertures 18 and 19 to receive a bolt 20, which also passes through eye 14 of the tooth. A nut 21 is engaged with said bolt and is firmly tightened thereon when the tooth is assembled with the bar. Thus the tooth is secured to the support only by means of bolt 20 and its nut 21 and is retained against relative movement by segment 16.

Since backwardly extending segment 15 of the tooth contacts coils 13, when there is any movement, this segment serves to dampen any variations set up in the tooth after flexing.

In the embodiment of the invention just described, the supporting bar is outside the coil. In Figures 5 and 6 I have shown a modified embodiment similar to that just described, except that the supporting bar is received within the coil. Structurally the tooth is similar, except the perpendicularly bent extremity, designated 16ª, extends downwardly toward the coil axis. The tooth is similarly supported on the bar by means only of a single bolt 20ª and segment 16ª, which enter apertures in the support. As before, a backwardly extending segment 15a provides vibration dampening means for the coil.

The constructions described provide wire teeth having simplified vibrations dampening means comprising only an integral, backwardly extending segment of the wire. The only additional fastening means required for attaching the teeth to a supporting bar are a single bolt and nut. The teeth are formed singly and thus are individually replaceable. In the embodiment shown in Figures 1 to 4, inclusive, any tooth on the support may be replaced without disturbing other teeth. Thus it is seen that I have provided an improved wire tooth construction that overcomes the disadvantages I have observed in previous constructions.

While I have shown only certain embodiments of the present invention, it is apparent that modifications may arise without departing from the spirit of the invention. Therefore, I do not wish to be limited by the disclosure set forth but only by the scope of the appended claims.

I claim:

1. A wire tooth including an elongated portion having a free end, a coil integral with the opposite end of said elongated portion with its axis perpendicular thereto and adapted to flex as the free end strikes an obstruction, an integral reverse bend at the opposite end of said coil forming an eye adapted to receive an attaching bolt, an integral segment extending back from said eye, substantially parallel to the coil axis and in close proximity to the outside of said coil for dampening vibrations, and additional means at the end of said segment for fixing the tooth to a support.

2. A wire tooth including an elongated portion having a free end for engaging ground, a coil integral with the opposite end of said elongated portion adapted to flex as the free end strikes an obstruction, an integral reverse bend at the opposite end of said coil forming an eye, an integral segment extending from said eye in close proximity to said coil lying along the length thereof and being engageable with the circumference of the coil convolutions for dampening vibrations, and an integral segment extending perpendicularly from said first named segment adapted to be received within a support.

3. A wire tooth including an elongated portion having a free end for engaging ground, a coil integral with the opposite end of said elongated portion with its axis perpendicular thereto and adapted to flex as the free end strikes an obstruction, an integral reverse bend at the opposite end of said coil forming an eye, an integral segment extending from said eye substantially parallel to the coil axis and in close proximity to the outside of said coil for dampening vibrations, and an integral segment extending perpendicularly from said first named segment adapted to be received within a support.

4. A wire tooth including an elongated portion having a free end for engaging ground, a coil integral with the opposite end of said elongated portion adapted to flex as the free end strikes an obstruction, an integral reverse bend at the opposite end of said coil forming an eye, an integral segment extending from said eye in close proximity to said coil lying along the length thereof and being engageable with the circumference of the coil convolutions for dampening vibrations, and an integral segment extending perpendicularly from said first named segment away from the coil axis and adapted to be received within a support.

5. A wire tooth including an elongated portion having a free end for engaging ground, a coil integral with the opposite end of said elongated portion adapted to flex as the free end strikes an obstruction, an integral reverse bend at the opposite end of said coil forming an eye, an integral segment extending from said eye in close proximity to said coil lying along the length thereof and being engageable with the circumference of the coil convolutions for dampening vibrations, and an integral segment extending perpendicularly from said first named segment toward the coil axis and adapted to be received within a support.

6. In combination with a supporting bar having spaced apertures, a wire tooth including an elongated portion having a free end for engaging ground, a coil integral with the opposite end of said elongated portion adapted to flex as the free end strikes an obstruction, an integral reverse bend at the opposite end of said coil forming an eye, fastening means passing through said eye and one of said support apertures, an integral segment extending from said eye substantially parallel to the coil axis and in close proximity to the outside of said coil for dampening vibrations, and an integral segment extending perpendicularly from said first named segment and received within another of said support apertures.

7. In combination with a supporting bar having spaced apertures, a wire tooth including an elongated portion having a free end for engaging ground, a coil integral with the opposite end of said elongated portion and extending alongside said supporting bar with its axis perpendicular to said elongated portion and being adapted to flex as the free end strikes an obstruction, an integral reverse bend at the opposite end of said coil forming an eye, fastening means passing through said eye and one of said support apertures, an integral segment extending from said eye substantially parallel to the coil axis and in close proximity to the outside of said coil for dampening vibrations, and an integral segment extending perpendicularly from said first named segment away from the coil axis and received within another of said support apertures.

8. In combination with a supporting bar having spaced apertures, a wire tooth including an elongated portion having a free end for engaging ground, a coil integral with the opposite end of said elongated portion and receiving said supporting bar with its axis perpendicular to said elongated portion and being adapted to flex as the free end strikes an obstruction, an integral reverse bend at the opposite end of said coil forming an eye, fastening means passing through said eye and one of said support apertures, an integral segment extending from said eye substantially parallel to the coil axis and in close proximity to the outside of said coil for dampening vibrations, and an integral segment extending perpendicularly from said first named segment toward the coil axis and received within another of said support apertures.

JOHN H. THOMAS.

REFERENCES CITED

The following references are of record in the file of this patent:

UNITED STATES PATENTS

| Number | Name | Date |
|---|---|---|
| 330,108 | Goettmann | Nov. 10, 1885 |